US012428199B2

(12) United States Patent
Abou Diwan

(10) Patent No.: US 12,428,199 B2
(45) Date of Patent: Sep. 30, 2025

(54) MULTI-FORMAT ENVELOPE, METHOD OF MANUFACTURING AND USING SUCH AN ENVELOPE

(71) Applicant: Tony Abou Diwan, Marseilles (FR)

(72) Inventor: Tony Abou Diwan, Marseilles (FR)

( * ) Notice: Subject to any disclaimer, the term of this patent is extended or adjusted under 35 U.S.C. 154(b) by 180 days.

(21) Appl. No.: 17/685,316

(22) Filed: Mar. 2, 2022

(65) Prior Publication Data

US 2022/0185541 A1 Jun. 16, 2022

Related U.S. Application Data

(63) Continuation-in-part of application No. PCT/IB2021/052647, filed on Mar. 30, 2021.

(30) Foreign Application Priority Data

Jan. 26, 2021 (EP) .................................... 21153569

(51) Int. Cl.
*B65D 27/14* (2006.01)
*B31B 70/26* (2017.01)
*B31B 70/62* (2017.01)

(52) U.S. Cl.
CPC ............ *B65D 27/14* (2013.01); *B31B 70/261* (2017.08); *B31B 70/62* (2017.08)

(58) Field of Classification Search
CPC ........ B65D 27/14; B31B 70/62; B31B 70/261
USPC .................................................... 229/75, 301
See application file for complete search history.

(56) References Cited

U.S. PATENT DOCUMENTS

| | | | | | |
|---|---|---|---|---|---|
| 1,091,172 A | * | 3/1914 | Thayer | B65D 27/06 | 229/305 |
| 1,126,784 A | * | 2/1915 | Kittka | B65D 27/16 | 229/80 |
| 1,957,704 A | * | 5/1934 | Drachman | B65D 27/06 | 229/305 |
| 2,220,231 A | * | 11/1940 | Gilfillan | A24F 23/02 | 229/80 |
| 3,372,861 A | * | 3/1968 | Johnson | B65D 27/16 | 229/80 |
| 3,557,519 A | * | 1/1971 | Lyon, Jr. | B41L 1/32 | 229/92.1 |
| 4,004,728 A | * | 1/1977 | Ryan | B65D 27/00 | 383/86 |
| 4,044,942 A | * | 8/1977 | Sherwood | B42D 15/08 | 229/92.7 |
| 4,305,506 A | * | 12/1981 | Greenwald | B65D 27/06 | 229/92.7 |
| 4,915,288 A | * | 4/1990 | Kao | B42D 15/08 | 229/80 |

(Continued)

FOREIGN PATENT DOCUMENTS

| | | |
|---|---|---|
| CH | 4 768 A | 7/1892 |
| DE | 20 2009 001769 U1 | 4/2009 |
| WO | 1990008701 A1 | 8/1990 |

*Primary Examiner* — Peter N Helvey
(74) *Attorney, Agent, or Firm* — Rahman LLC

(57) ABSTRACT

An envelope includes a front face receiving a closing fold and a rear face, the envelope being in a first format. The envelope includes at least one transverse fold line configured to enable the envelope to be folded on itself on its rear face so as to form at least one second format. The envelope includes at least one gluing strip on the rear face for gluing the folded envelope in the second format. A process, a use, and packaging based on such an envelope is also provided.

6 Claims, 4 Drawing Sheets

(56) References Cited

U.S. PATENT DOCUMENTS

| | | | | |
|---|---|---|---|---|
| 4,948,028 | A * | 8/1990 | Vollowitz | B65D 27/00 229/80 |
| 7,357,423 | B2 * | 4/2008 | Fabel | B42D 15/02 229/92.1 |
| 2022/0177195 | A1 * | 6/2022 | Brooks | B65D 27/28 |

* cited by examiner

MULTI-FORMAT ENVELOPE, METHOD OF MANUFACTURING AND USING SUCH AN ENVELOPE

CROSS-REFERENCE TO RELATED APPLICATIONS

This application is a continuation-in-part of PCT patent application no. PCT/IB2021/052647 filed on Mar. 30, 2021, which claims priority to European patent application no. EP 21153569.5 filed on Jan. 26, 2021, the complete disclosures of which, in their entireties, are herein incorporated by reference.

FIELD OF THE INVENTION

The invention concerns a development of an envelope convertible into 3 different formats.

PRIOR STATE OF THE ART

The prior art provides different types of envelopes available in a single format. In order to have several formats, it is necessary to obtain a batch of each format.

PRESENTATION OF THE INVENTION

The invention aims to provide an envelope that can take at least 2 or 3 different formats of standard content already known in commerce:

C4 envelope (229×324 mm);

C5 envelope (162×229 mm);

DL envelope (220×110 mm).

To achieve this objective, the invention provides an envelope comprising a front face receiving a closing fold and a rear face, the envelope being in a first format, characterized in that it comprises at least one transverse fold line configured to enable the envelope to be folded on itself on its rear face so as to form at least one second format; and in that it comprises at least one gluing strip on the rear face for gluing the folded envelope in said second format. The gluing strip is configured to glue faces of the envelope. The gluing strip may comprise one or more of a double-sided adhesive tape, an adhesive strip, a sealing gum or the like. The gluing strip may have a thickness higher than about 4 mm, and preferably equal to or below about 12 mm.

Advantageously, the foldings and gluings enable the use of a single envelope to be reconfigured to the chosen format.

According to other aspects taken alone or combined according to all technically feasible combinations:

- the envelope comprises three transverse fold lines configured to enable the envelope to be folded on itself so as to form a third format; and/or
- the envelope comprises protecting removable strips for said gluing strip.

The invention further relates to a method of manufacturing an envelope, comprising steps for

- placing at least one transverse fold line configured to enable the envelope to be folded on itself on its rear face so as to form at least one second format; and
- placing at least one gluing strip on the rear face to glue the folded envelope in said second format.

Another object of the invention relates to a method of use or a use of an envelope, comprising steps for

- folding the envelope on itself on its rear face so as to form at least one second format; and
- gluing the envelope in said second format on the rear face, via gluing strips provided on the envelope.

The invention further relates to a packaging comprising a front face receiving a closing fold and a rear face, the packaging being in a first format, characterized in that it comprises at least one transverse fold line configured to enable the envelope to be folded on itself on its rear face so as to form at least one second format (C5, DL); and in that it comprises at least one gluing strip on the rear face for gluing the folded envelope in said second format.

BRIEF DESCRIPTION OF THE DRAWINGS

The invention will be further detailed by the description of non-limiting embodiments, and on the basis of the appended figures, among which.

DETAILED DESCRIPTION

Concretely, the idea exposed is to offer a foldable and glueable envelope so that the latter can adapt to 3 different formats of standard content and already known in commerce:

C4 envelope (229×324 mm);

C5 envelope (162×229 mm);

DL envelope (220×110 mm).

Starting from a C4 envelope, it is proposed to transform this format into several other formats according to their needs, and this by proceeding with foldings and gluings easy and quick for the user.

In order to design the C4 envelope, it must be taken into account that foldings and gluings would be carried out subsequently to transform the envelope. These gluings (strips C in the figures) reduce the dimensions of the content (dimensions of the sheets that can be inserted into the envelope) when switching to C5 and DL.

The most restrictive dimension to respect after gluing is 229 mm.

The envelope according to the invention can be an envelope according to the A4 format (C4 envelope).

Figure 1:
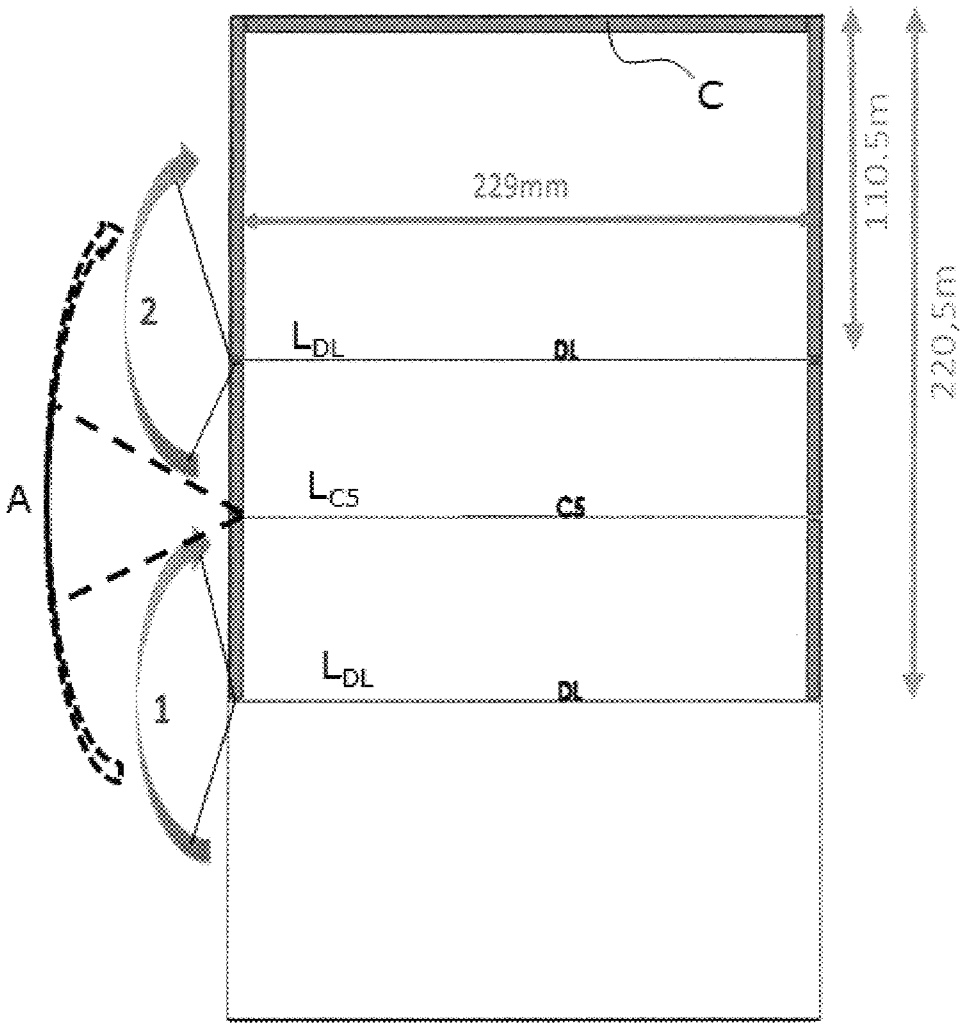
FIG. 1 is a plan view of the rear face of the envelope according to a preferred variant of the invention
Figure 2:
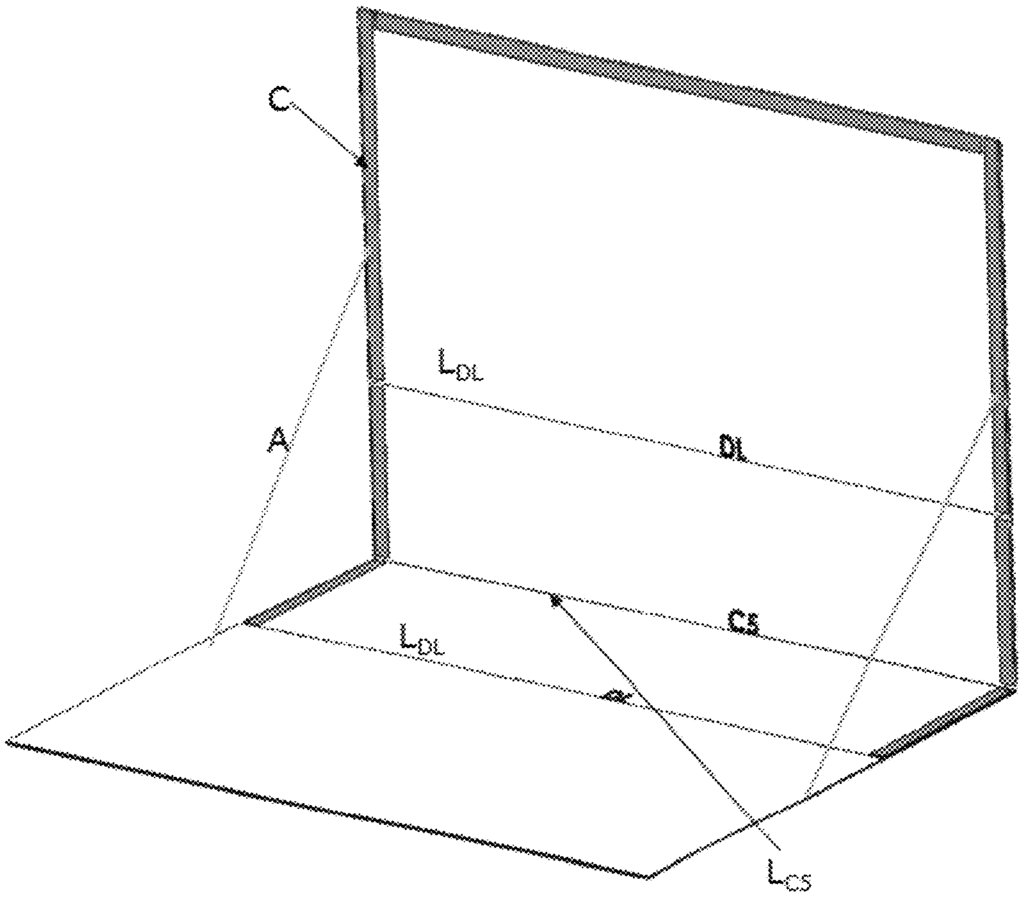
FIG. 2 is a scheme of the folding of the envelope of FIG. 1 towards the C5 format.
Figure 3:
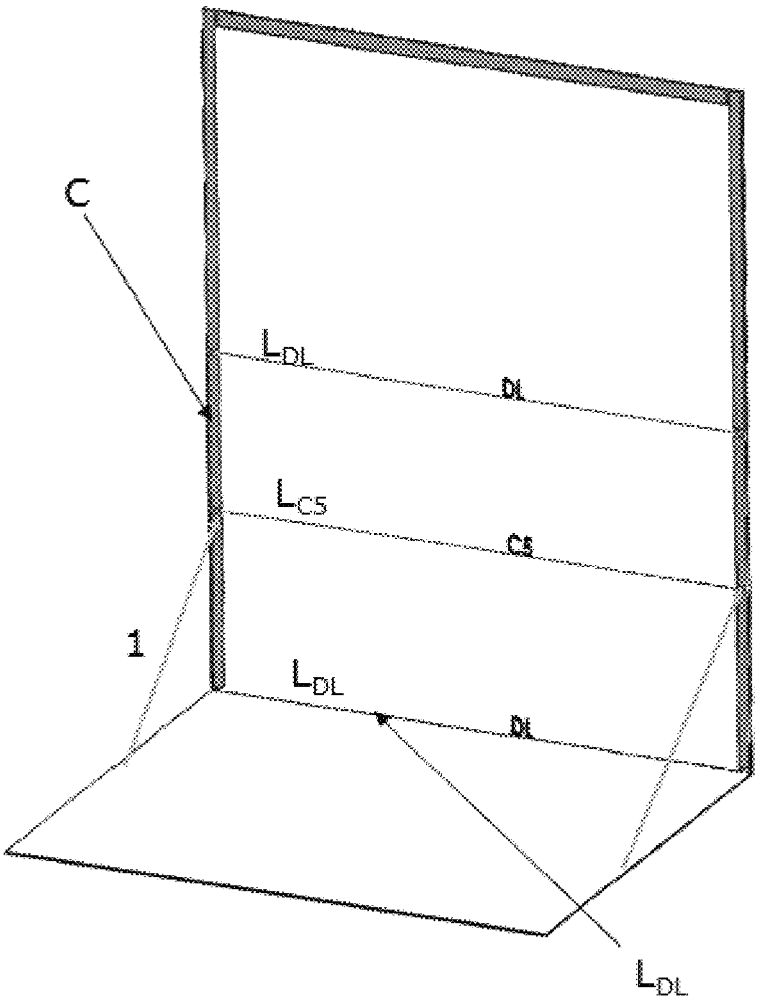
FIG. 3 and FIG. 4 are a scheme of the first and second stages of folding the envelope of FIG. 1 towards the DL format.
Figure 4:
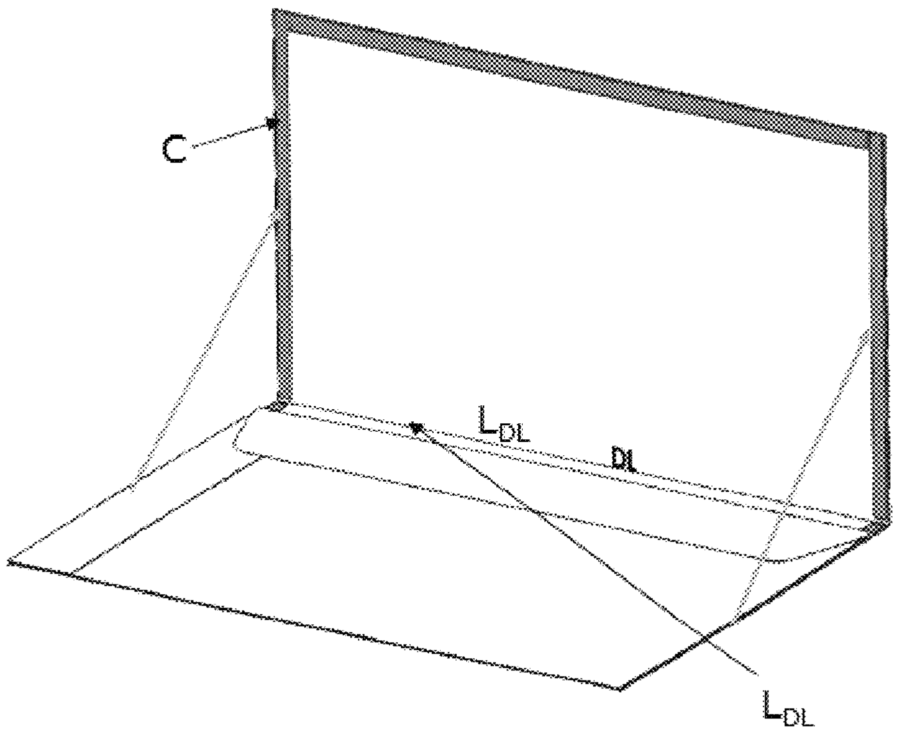

Preferably, lines (references) will be indicated, in particular printed, on the envelope in order to guide the user on how to fold the envelopes to arrive at the desired size. The fold lines can be illustrated by FIG. 1: LC5, LDL. The paper can be pre-folded in some embodiments.

Regarding the C4 to C5 transformation, in order to have a desired format (C5), the user will have to fold the C4 format in half (folding A on line LC5), that is 162 mm from the top of the envelope in the example. The strips represent the gluing zones C. These two gluing strips are spaced 229 mm apart in order to be able to comply with the contents of standard envelopes, the latter being 5 mm thick in the example. The gluing strip may be thicker, for example above 6 mm, and preferably equal to or below 12 mm. Folding is done in the middle of the envelope and the C strip will stick against the top of the envelope.

Regarding the C4 to DL transformation, in order to have a desired format (DL), the user will have to fold the C4 format into three (folds 1 then 2 on lines LDL), that is 110.5 mm and 220.5 mm from the top of the envelope in the example. The strips represent the gluing zones C. These two gluing strips are spaced 229 mm apart in order to comply with the contents of the standard envelopes, the latter being 5 mm thick in the example. The folding is done approximately by the two-thirds of the envelope. One starts with the lower part that one glues on the second third of the envelope (middle third). Then one comes and glues the last third.

The invention therefore makes it possible to configure 3 different envelope formats, starting from a single envelope. The invention is adaptable to other configurations where the folding of an envelope results in another envelope size.

Methods of making and using the envelope are also part of the invention. An envelope making machine can be set up to make an envelope according to the invention.

The envelope of the invention is to be interpreted as any form of packaging, such as a sleeve, in any packaging material, including paper, cardboard, plastic, and the like, as long as the packaging may be folded and glued as specified in the invention.

What is claimed is:

1. An envelope comprising:

a first side;

a second side opposite to the first side;

a front face on the first side;

a rear face on the second side, comprising a closing fold moving between a backward direction corresponding to an opening position of the envelope and a forward position corresponding to a closing position of the envelope;

wherein the front face receives and is pasted to the closing fold in the closing position;

wherein the front face and the rear face comprise at least one transverse fold line parallel to the closing fold;

wherein the rear face comprises at least one gluing strip on the second side;

a first format comprising the front face positioned on the first side and the rear face positioned on the second side; and a second format comprising the rear face and the front face folded rearwardly towards the second side along the at least one transverse fold line so as to fold the rear face over itself and to paste the rear face over itself.

2. The envelope of claim 1, wherein the at least one transverse fold line comprises three spaced apart transverse fold lines configured to enable the envelope to be folded rearwardly on itself so as to form a third format.

3. The envelope of claim 1, comprising protectable removable strips covering the at least one gluing strip.

4. The envelope of claim 2, comprising protectable removable strips for covering the at least one gluing strip.

5. A method of manufacturing an envelope, wherein the method comprises:

providing a first side of the envelope;

providing a second side of the envelope opposite to the first side;

establishing a front face on the first side;

establishing a rear face on the second side, wherein the rear face comprises a closing fold moving between a backward direction corresponding to an opening position of the envelope and a forward position corresponding to a closing position of the envelope;

wherein the front face receives and is pasted to the closing fold in the closing position;

placing at least one transverse fold line parallel to the closing fold on the front face and the rear face;

orienting a first format for the envelope, wherein the first format comprises the front face positioned on the first side and the rear face positioned on the second side; and orienting a second format for the envelope, wherein the rear face and the front face are folded rearwardly towards the second side along the at least one transverse fold line so as to fold the rear face over itself and to paste the rear face over itself.

6. A packaging comprising:

a first side;

a second side opposite to the first side;

a front face on the first side;

a rear face on the second side, comprising a closing fold moving between a backward direction corresponding to an opening position of the envelope and a forward position corresponding to a closing position of the envelope;

wherein the front face receives and is pasted to the closing fold in the closing position;

wherein front face and the rear face comprise at least one transverse fold line parallel to the closing fold;

wherein the rear face comprises at least one gluing strip on the second side;

a first format comprising the front face positioned on the first side and the rear face positioned on the second side; and a second format comprising the rear face and the front face folded rearwardly towards the second side along the at least one transverse fold line so as to fold the rear face over itself and to paste the rear face over itself.

* * * * *